(12) United States Patent
Fukasawa

(10) Patent No.: US 11,668,362 B2
(45) Date of Patent: Jun. 6, 2023

(54) ACTUATOR AND BRAKE

(71) Applicant: SUMITOMO HEAVY INDUSTRIES, LTD., Tokyo (JP)

(72) Inventor: Toshiki Fukasawa, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 84 days.

(21) Appl. No.: 17/355,894

(22) Filed: Jun. 23, 2021

(65) Prior Publication Data

US 2021/0404525 A1 Dec. 30, 2021

(30) Foreign Application Priority Data

Jun. 24, 2020 (JP) .............................. JP2020-108304

(51) Int. Cl.
| | |
|---|---|
| *B60T 13/74* | (2006.01) |
| *F16D 65/18* | (2006.01) |
| *F16D 65/12* | (2006.01) |
| *F16D 55/224* | (2006.01) |
| *F16D 65/847* | (2006.01) |
| *B25J 19/00* | (2006.01) |

(Continued)

(52) U.S. Cl.
CPC ......... *F16D 65/186* (2013.01); *F16D 55/224* (2013.01); *F16D 65/123* (2013.01); *F16D 65/847* (2013.01); *B25J 19/0004* (2013.01); *F16D 2121/24* (2013.01); *F16D 2125/50* (2013.01)

(58) Field of Classification Search
CPC .... F16D 65/123; F16D 65/186; F16D 65/847; F16D 55/224; F16D 2121/24; F16D 2125/50; B25J 19/0004

USPC .............. 188/71.5, 158–164, 170, 171, 173; 310/77, 93, 103

See application file for complete search history.

(56) References Cited

U.S. PATENT DOCUMENTS

| | | | |
|---|---|---|---|
| 5,528,950 A | | 6/1996 | Organek et al. |
| 6,098,479 A | * | 8/2000 | Hoermansdoerfer ... F16D 65/18 |
| | | | 475/333 |

(Continued)

FOREIGN PATENT DOCUMENTS

| | | |
|---|---|---|
| CN | 2628809 Y | 7/2004 |
| CN | 103378686 A | 10/2013 |

(Continued)

OTHER PUBLICATIONS

Office Action in Chinese Application No. 202110684709.3, dated Feb. 3, 2023.

*Primary Examiner* — Christopher P Schwartz (74) *Attorney, Agent, or Firm* — Michael Best & Friedrich LLP (57) ABSTRACT

Provided is an actuator including: a motor; a brake; a motor casing that accommodates a constituent member of the motor; and a brake casing that accommodates a constituent member of the brake. The motor casing and the brake casing are connected to each other, the brake includes a stator having a coil and a coil case, and a friction plate, a minimum outer diameter of the coil case is 70 mm or less, and a value obtained by dividing a distance from a first end surface of the friction plate on a side farthest in an axial direction from the coil case to a second end surface of the coil case on a side opposite to the first end surface by the minimum outer diameter is 0.2 or less.

18 Claims, 4 Drawing Sheets

(51) Int. Cl.
　　　*F16D 121/24*　　　(2012.01)
　　　*F16D 125/50*　　　(2012.01)

(56) References Cited

U.S. PATENT DOCUMENTS

| | | | | |
|---|---|---|---|---|
| 2004/0040801 | A1* | 3/2004 | Yamamoto | B60T 13/748 188/161 |
| 2007/0034459 | A1* | 2/2007 | Matsushita | B60T 13/74 188/72.6 |
| 2016/0156288 | A1* | 6/2016 | Sawamura | H02P 3/04 318/372 |
| 2019/0106096 | A1* | 4/2019 | Tang | F16D 63/006 |
| 2019/0170200 | A1* | 6/2019 | Isono | F16D 65/186 |
| 2020/0156612 | A1* | 5/2020 | Ikuma | F16D 65/18 |
| 2021/0102587 | A1* | 4/2021 | Isono | F16D 63/002 |

FOREIGN PATENT DOCUMENTS

| | | |
|---|---|---|
| CN | 204961706 U | 1/2016 |
| JP | H08-219194 A | 8/1996 |
| JP | 2017-229162 A | 12/2017 |

* cited by examiner

ACTUATOR AND BRAKE

RELATED APPLICATIONS

The content of Japanese Patent Application No. 2020-103304, on the basis of which priority benefits are claimed in an accompanying application data sheet, is in its entire incorporated herein by reference.

BACKGROUND

Technical Field

A certain embodiment of the present invention relates to an actuator and a brake.

Description of Related Art

The related art discloses an electromagnetic friction brake in which a movable disk interposes an intermediate disk to generate a braking force, and when a coil is energized, the interposing is released and the braking force is released. The electromagnetic friction brake in the related art has a thickness reduced in the axial direction by disposing the movable disk, a fixed disk, and the intermediate disk inside the coil.

SUMMARY

According to one aspect of the present invention, there is provided an actuator including a motor, a brake, a motor casing that accommodates a constituent member of the motor, and a brake casing that accommodates a constituent member of the brake, in which the motor casing and the brake casing are connected to each other, the brake includes a stator having a coil and a coil case, and a friction plate, a minimum outer diameter of the coil case is 70 mm or less, and a value obtained by dividing a distance from a first end surface of the friction plate on a side farthest in an axial direction from the coil case to a second end surface of the coil case on a side opposite to the first end surface by the minimum outer diameter is 0.2 or less.

According to another aspect of the present invention, there is provided a brake including a stator including a coil and a coil case, and a friction plate, the minimum outer diameter of the coil case is 70 mm or less, and the first end surface of the friction plate on the side farthest in the axial direction from the coil case is the second end surface of the coil case opposite to the first end surface. The value obtained by dividing the distance to the end face by the minimum outer diameter is 0.2 or less.

DETAILED DESCRIPTION

In the brake that operates by energizing the coil, the coil generates heat when energized. Therefore, there is a tendency for a coil case to be enlarged to enhance the heat dissipation effect.

It is desirable to provide a brake that is thin and that can be used in a normal temperature range, and an actuator having such a brake.

Hereinafter, an embodiment of the present invention will be described in detail with reference to the drawings.

Figure 1:
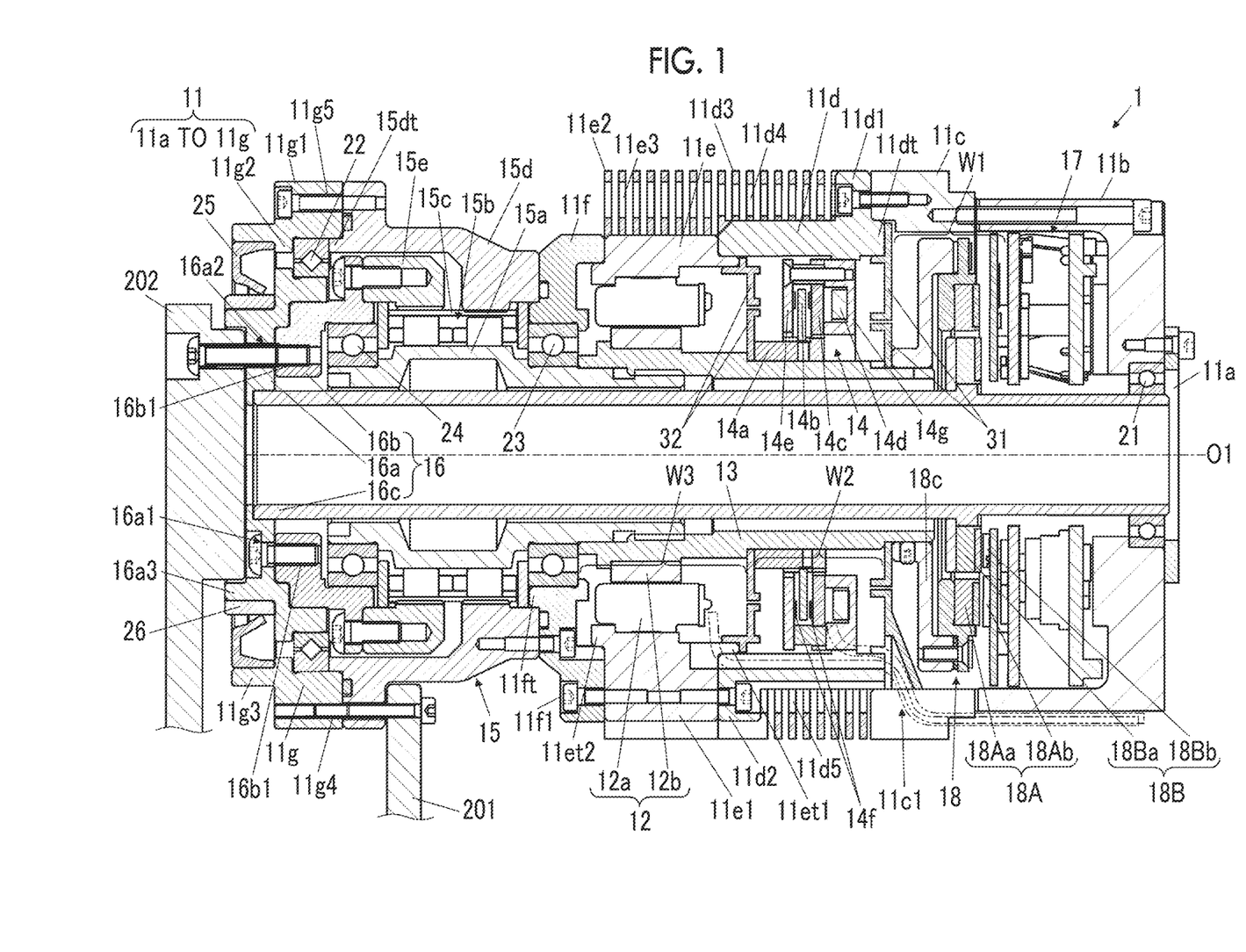
FIG. 1 is a cross-sectional view illustrating an actuator according to an embodiment of the present invention.

FIG. 1 is a cross-sectional view illustrating an actuator according to an embodiment of the present invention. Hereinafter, the direction along a center axis O1 is referred to as an axial direction, the direction perpendicular to the center axis O1 is referred to as a radial direction, and the rotation direction centered on the center axis O1 is referred to as a circumferential direction. The center axis O1 is the rotation center axis of a shaft portion 16c of an output member 16 and a rotor shaft 13. Furthermore, in the axial direction, the side where the output member 16 is located (left side in FIG. 1) is referred to as an output side, and the side opposite thereto (right side in FIG. 1) is referred to as a counter-output side or an input side.

An actuator 1 of the present embodiment is a device that outputs rotational power, and is provided with a casing 11 connected to a support member 201 outside the device, a motor (electric motor) 12 for generating rotational power, a rotor shaft 13 that receives torque from the motor 12, a brake 14 that can apply braking force to the rotor shaft 13, a speed reducer 15 that reduces a rotating motion of the rotor shaft 13, an output member 16 that outputs the rotating motion decelerated by the speed reducer 15 to the outside of the device (mating member 202), a circuit unit 17 on which an electric circuit is mounted, and a detection unit 18 that detects the rotation of the rotor shaft 13 and the output member 16. The circuit unit 17 includes a motor driver board on which a drive circuit of the motor 12 is mounted, and an encoder board on which a detection circuit of the detection unit 18 is mounted. The detection unit 18 includes an input side rotation detector 18A for detecting the rotation of the rotor shaft 13 and an output side rotation detector 18B for detecting the rotation of the output member 16. The speed reducer 15, the motor 12, the brake 14, the detection unit 18, and the circuit unit 17 are disposed side by side from the output side to the counter-output side in this order.

Between the casing 11 and the rotary shaft portion (rotor shaft 13, wave generator 15a or shaft portion 16c), a detection unit accommodating space W1 for accommodating the constituent member of the detection unit 18, a brake accommodating space W2 for accommodating the constituent member of the brake 14 and a motor accommodating space W3 for accommodating the constituent member of the motor 12 are provided. The actuator 1 further includes a first inhibition wall 31 that inhibits the flow of foreign matter between the detection unit accommodating space W1 and the brake accommodating space W2, and includes a second inhibition wall 32 that inhibits the flow of foreign matter between the brake accommodating space W2 and the motor accommodating space W3.

The casing 11 is made of hollow tubular or annular members connected to each other. The casing 11 includes a counter output side casing 11a, a board casing 11b, a relay casing 11c, a brake casing 11d, a motor casing 11e, a relay casing 11f, a speed reducer casing (outer peripheral portion of first internal gear 15d), and an output side casing 11g. Hereinafter, a specific structural example of the casing 11 will be described, and the casing according to the present invention is not limited to this specific example.

The counter-output side casing 11a covers the periphery of one end portion of the shaft portion 16c on the counter-output side. The counter-output side casing 11a includes a through-hole penetrating in the axial direction, and the through-hole of the counter-output side casing 11a communicates with a through-hole of the shaft portion 16c. The counter-output side casing 11a is in contact with an outer ring of a bearing 21 in the axial direction. The counter-output side casing 11a is connected to the board casing 11b via a bolt (connection member).

The board casing 11b covers the circuit unit 17 from the radial direction and the counter-output side in the axial direction, internally fits the outer ring of the bearing 21, and is connected to the relay casing 11c via a bolt.

The relay casing 11c is located outside of the detection unit 18 in the radial direction and covers the detection unit 18 from the radial direction. The relay casing 11c is connected to the board casing 11b and the brake casing 11d via bolts. The relay casing 11c includes a wiring lead-out hole 11c1 for leading out the wiring of the motor 12 and the brake 14 in a part in the circumferential direction.

The brake casing 11d is located outside of the brake 14 in the radial direction, covers the brake 14 in the radial direction, and accommodates the constituent member of the brake 14. The brake casing 11d internally fits and supports a coil case 14g. The brake casing 11d includes an annular protrusion portion 11dt that protrudes to the counter-output side. The annular protrusion portion 11dt has a diameter smaller than the maximum outer diameter of the brake casing 11d, and is fitted (spigot fitted) into the relay casing 11c. The brake casing 11d includes flange portions 11d1 at a plurality of locations in the circumferential direction on the counter-output side, and the flange portions 11d1 are connected to the relay casing 11c via bolts. Furthermore, the brake casing 11d includes flange portions 11d2 at a plurality of locations in the circumferential direction on the output side, and the flange portions 11d2 are connected to the motor casing 11e via bolts. The brake casing 11d is provided with a plurality of fins 11d3 disposed on the outer peripheral portion other than the flange portions 11d1 and 11d2. Each of the fins 11d3 extends in the radial direction and in the circumferential direction. In the plurality of fins 11d3, through-holes 11d4 and 11d5 through which the tips of bolts and tools are passed are provided at locations corresponding to bolt holes of the flange portions 11d1 and 11d2 (locations overlapping the bolt holes when the bolt holes are extended in the axial direction).

The motor casing 11e is located outside of the motor 12 in the radial direction, covers the motor 12 in the radial direction, and supports a fixed side member of the motor 12. The motor casing 11e includes an annular protrusion portion 11et1 protruding to the counter-output side and an annular protrusion portion 11et2 protruding to the output side. The annular protrusion portion 11et1 on the counter-output side has a diameter smaller than the maximum outer diameter of the motor casing 11e, and is fitted (spigot-fitted) into the brake casing 11d. The annular protrusion portion 11et2 on the output side has a diameter smaller than the maximum outer diameter of the motor casing 11e, and is fitted (spigot-fitted) into the relay casing 11f. The motor casing 11e includes flange portions 11e1 at a plurality of locations in the circumferential direction, and the flange portions 11e1 are connected to the brake casing 11d and the relay casing 11f via bolts. The motor casing 11e is provided with a plurality of fins 11e2 disposed on the outer peripheral portion other than the flange portion 11e1. Each of the fin 11e2 extends in the radial direction and in the circumferential direction. The fins 11e2 and the fins 11d3 of the brake casing 11d described above are adjacent to each other, and through-holes 11e3 through which the bolts and the tools are passed are provided at positions continuous with the through-holes 11d4 of the fins 11d3 (positions overlapping when the through-holes 11d4 are extended) in the plurality of fins 11e2.

The relay casing 11f covers the output side of the motor 12, and an outer ring of the bearing 23 disposed on the counter-output side of the speed reducer 15 is internally fitted. The relay casing 11f rotatably supports the wave generator 15a via the bearing 23. The relay casing 11f includes a flange portion 11f1 in a position corresponding to the flange portion 11e1 of the adjacent motor casing 11e, adjacent the flange portions 11f1 and 11e1 are connected to each other via the bolts. In the flange portions 11f1 and 11e1, a bolt hole for connecting the relay casing 11f and the motor casing 11e and a bolt hole for connecting the motor casing 11e and the brake casing 11d on the counter-output side therefrom may be disposed coaxially. The relay casing 11f is further connected to the constituent member (first internal gear 15d) of the speed reducer 15 via a bolt. The relay casing 11f includes an annular protrusion portion 11ft that protrudes to the output side. The annular protrusion portion 11ft has a diameter smaller than the maximum outer diameter of the relay casing 11f, and is fitted (spigot-fitted) into the first internal gear 15d.

The outer peripheral portion of the first internal gear 15d functions as a speed reducer casing, and accommodates the constituent member of the speed reducer 15.

The output side casing 11g covers the output member 16 in the radial direction at the output-side end portion, and internally fits the outer ring of a bearing 22 and a seal 25. The output side casing 11g rotatably supports the output member 16 via the bearing 22. The output side casing 11g includes a flange portion 11g1 overhanging in the radial direction, and the flange portion 11g1 is connected to the constituent member of the speed reducer 15 (first internal gear 15d) via a bolt, and is further connected to the support member 201 via a bolt in a state where the first internal gear 15d is jointly fastened. The first internal gear 15d includes a portion overhanging on the output side from the second internal gear 15e to cover the outer side of the second internal gear 15e in the radial direction, and this portion is connected to the output side casing 11g. An annular protrusion portion 15dt protruding to the output side is provided at a portion of the first internal gear 15d overhanging on the output side. The annular protrusion portion 15dt has a diameter smaller than the maximum outer diameter of the first internal gear 15d, and is fitted (spigot-fitted) into the output side casing 11g. In the flange portion 11g1 of the output side casing 11g, a bolt insertion hole 11g5 communicating with the screw hole provided in the constituent members of the speed reducer 15 and a screw hole 11g4 communicating with the bolt insertion hole provided in the constituent members of the speed reducer 15 are included at a plurality of different positions in the circumferential direction. By combining the direct connection of the output side casing 11g and the first internal gear 15d via the bolt insertion hole 11g5 and the connection of the output side casing 11g and the support member 201 to which the first internal gear 15d is jointly fastened via the screw hole 11g4, a specified connection intensity between the output side casing 11g and the first internal gear 15d is achieved.

Furthermore, the output side casing 11g includes a positioning protrusion (ring portion) 11g2 that protrudes inward in the radial direction and that determines a position of the bearing 22 in the axial direction and a position of the seal 25 in the axial direction. Furthermore, the output side casing 11g includes a tubular extension portion 11g3 extending in the axial direction and accommodating the seal 25. The tubular extension portion 11g3 extends to the output side from the flange portion 11g1 on the output side of the bearing 22.

The output member 16 includes member 16a and 16b and a shaft portion 16c connected to each other, and is rotatably supported by the casing 11 via the bearings 21 and 22. The output member 16 has a hollow structure (hollow tubular shape). A part of the output member 16 is exposed on the output side, and an exposed portion is connected to the mating member 202. More specifically, the shaft portion 16c penetrates the speed reducer 15 and extends to the counter-output side where the detection unit 18 and the circuit unit 17 are disposed. A rotary portion 18Ba of the output side rotation detector 18B is fixed to the shaft portion 16c. The shaft portion 16c is tightly fitted into the member 16a on the output side. The member 16b is connected to a second internal gear 15e of the speed reducer 15 via the bolt and internally fits an outer ring of a bearing 24 on the output side of the speed reducer 15. The member 16b introduces the rotating motion decelerated from the speed reducer 15 and rotatably supports the wave generator 15a via the bearing 24.

The member 16a is disposed on the output side of the member 16b, internally fits the shaft portion 16c, and externally fits an inner ring of the bearing 22. The member 16a includes a bolt insertion hole 16a1 through which the shaft portion of the bolt is passed and accommodates the head of the bolt, and a bolt insertion hole 16a2 through which the shaft portion of the bolt passes. The bolt insertion holes 16a1 and 16a2 communicate with any of a plurality of screw holes 16b1 of the adjacent member 16b. The member 16a is directly connected (temporarily fixed) to the member 16b via a bolt inserted into the bolt insertion hole 16a1. Furthermore, the member 16a is jointly fastened between the mating member 202 and the member 16b via a bolt inserted into the bolt insertion hole 16a2. That is, the mating member 202 is connected to the output member 16 via a bolt screwed into the screw hole of the member 16b via the bolt insertion hole 16a2. The member 16a achieves a specified connection intensity to the member 16b via the direct connection to the member 16b (connection via 4 bolts having different positions in the circumferential direction) and the joint fastening interposed between the member 16b and the mating member 202 (connection via 8 bolts having different positions in the circumferential direction).

The member 16a includes a tubular portion 16a3 that faces the tubular extension portion 11g3 of the casing 11 in the radial direction. The tubular portion 16a3 is disposed on the output side of the bolt insertion hole 16a1. In the tubular portion 16a3, a sleeve 26 that comes in contact with the lip portion of the seal 25 is externally fitted, and the seal 25 is disposed between the sleeve 26 and the tubular extension portion 11g3 of the casing 11.

The motor 12 includes a stator 12a and a hollow tubular rotor 12b. The rotor 12b includes a permanent magnet, and the stator 12a includes an electromagnet. The rotor shaft 13 has a hollow structure and is externally fitted to the shaft portion 16c of the output member 16 with a gap therebetween. The rotor shaft 13 is connected to the rotor 12b of the motor 12. The motor 12 and the rotor shaft 13 are disposed on the counter-output side of the speed reducer 15. On the counter-output side, a rotary portion 18Aa of the input side rotation detector 18A is fixed to the rotor shaft 13 via a hub member 18c.

The speed reducer 15 is a tubular bending meshing type gear mechanism, and is provided with a wave generator 15a, a wave generator bearing 15b, an external gear 15c that bends and deforms due to rotation of the wave generator 15a, and a first internal gear 15d and a second internal gear 15e that mesh with the external gear 15c. The reduction mechanism is not limited to the tubular bending meshing gear mechanism, and various reduction mechanisms can be adopted. For example, a cup type or top hat type bending meshing gear mechanism, an eccentric oscillation type reduction mechanism, or a simple planetary reduction mechanism may be adopted. In addition, the actuator 1 may not include a speed reducer. The wave generator 15a has a hollow structure and is disposed outside on the shaft portion 16c of the output member 16 with a gap therebetween. The wave generator 15a is connected to the rotor shaft 13 (for example, spline connected) and rotates integrally with the rotor shaft 13. The shaft portion of the wave generator 15a is rotatably supported by the casing 11 and the output member 16 via the bearings 23 and 24. In the wave generator 15a, a cross-sectional outer shape perpendicular to the axial direction in a shaft portion has a circular shape centered on a center axis O1, and a cross-sectional outer shape perpendicular to the axial direction at a portion with which the wave generator bearing 15b is in contact has, for example, an elliptical shape. The external gear 15c has flexibility. The first internal gear 15d is connected to the casing 11 and meshes with the external gear 15c in the range on the counter-output side in the axial direction. The second internal gear 15e is connected to the output member 16 and meshes with the external gear 15c in the range on the output side in the axial direction.

Each member of the actuator 1 may be made of a plurality of different types of materials. For example, the relay casing 11c, the brake casing 11d, the motor casing 11e, the output side casing 11g, and the members 16a and 16b of the output member 16 may be made of a light metal such as aluminum. The relay casing 11f, the first internal gear 15d, and the second internal gear 15e may be made of a resin material such as carbon fiber reinforced resin (carbon fiber reinforced plastic: CFRP). As the resin material, a fiber reinforced resin such as FRP (fiber-reinforced plastic) can be applied. The sleeve 26 on which the seal 25 slides may be made of an iron-based metal such as steel.

The detection unit 18 includes the input side rotation detector 18A for detecting the rotation of the rotor shaft 13 and the output side rotation detector 18B for detecting the rotation of the output member 16. The input side rotation detector 18A includes the rotary portion 18Aa that rotates integrally with the rotor shaft 13 and a sensor 18Ab that is disposed in the vicinity of the rotary portion 18Aa and detects the amount of rotation of the rotary portion 18Aa. The output side rotation detector 18B includes the rotary portion 18Ba that rotates integrally with the output member 16 and a sensor 18Bb that is disposed in the vicinity of the rotary portion 18Ba and detects the amount of rotation of the rotary portion 18Ba. The input side rotation detector 18A and the output side rotation detector 18B are, for example, rotary encoders that output the rotational displacement of the rotary portion as a digital signal, and may be resolvers that output as an analog signal, or may be rotation detectors other than the rotary encoder and the resolver. The rotary encoder may have a configuration having an optical detection unit or a configuration having a magnetic detection unit. The input side rotation detector 18A and the output side rotation detector 18B may be different types of detectors.

In the input side rotation detector 18A and the output side rotation detector 18B, the two sensors 18Ab and 18Bb are mounted on the encoder board of the circuit unit 17, and the two rotary portions 18Aa and 18Ba are disposed so as to face the circuit unit 17 on the output side. More specifically, the installation position of the rotary portion 18Ba on the output member 16 and the installation position of the rotary portion 18Aa on the rotor shaft 13 are substantially the same as each other in the axial direction, and similarly, the two sensors 18Ab and 18Bb are disposed at substantially the same position in the axial direction. That is, the rotary portions 18Aa and the rotary portion 18Ba are disposed at a position overlapping when viewed from the radial direction, and the rotary portion 18Aa is disposed outside in the radial direction. In addition, the sensor 18Ab and the sensor 18Bb are disposed at a position overlapping when viewed from the radial direction, and the sensor 18Ab is disposed outside in the radial direction.

Brake Configuration

Figure 2A:
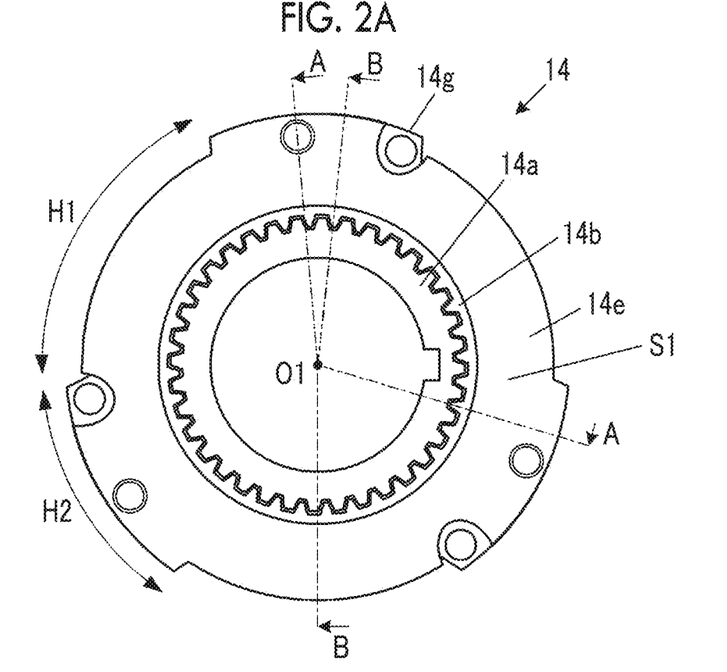
FIG. 2A is a view of a brake according to the embodiment of the present invention viewed from a fixed friction plate side and FIG. 2B is a view viewed from a coil case side.
Figure 2B:
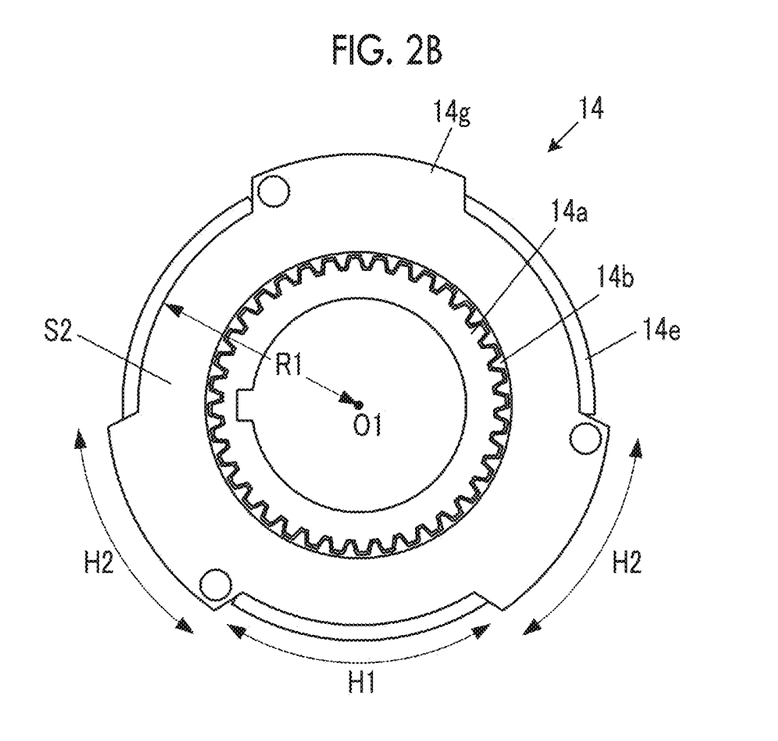
Figure 3A:
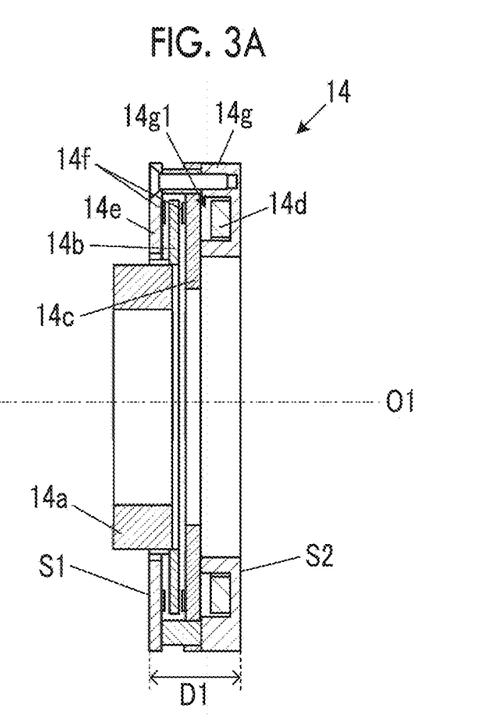
FIG. 3A is a sectional view taken along line A-A.
Figure 3B:
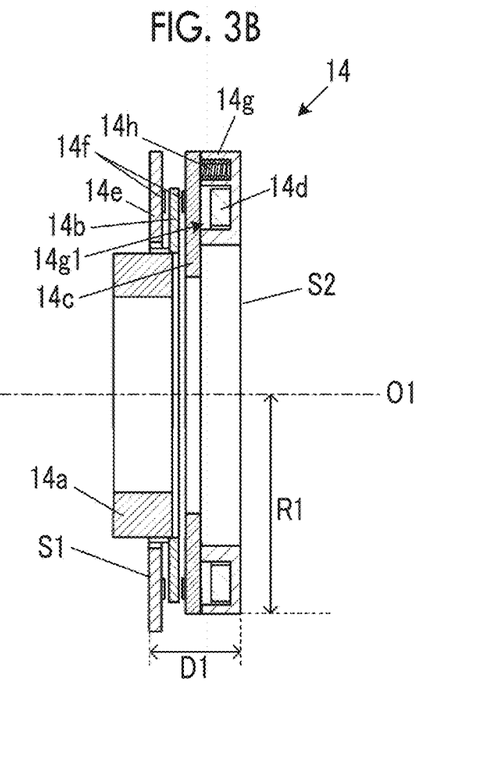
FIG. 3B is a sectional view taken along line B-B in FIG. 2A.

FIG. 2A is a view of a brake according to the embodiment of the present invention viewed from a fixed friction plate side, and FIG. 2B is a view viewed from a coil case side. FIG. 3A is a sectional view taken along line A-A, and FIG. 3B is a sectional view taken along line B-B in FIG. 2A.

The brake 14 has an annular shape centered on the center axis O1, and the rotor shaft 13 is passed through the central through-hole. The brake 14 is provided with a hub member 14a with a key groove internally fitted into the rotor shaft 13, a rotating friction plate 14b engaged with the hub member 14a, a movable friction plate (armature) 14c which can be displaced toward the rotating friction plate 14b, a fixed friction plate 14e which faces the rotating friction plate 14b on the side opposite to the movable friction plate 14c, a coil 14d which generates a magnetic force attracting the movable friction plate 14c to the coil case 14g side, a spring material 14h (FIG. 3B) that biases the movable friction plate 14c toward the fixed friction plate 14e, and a coil case 14g supported by the brake casing 11d to hold the coil 14d. The combination of the coil 14d and the coil case 14g functions as a stator. The coil case 14g is in contact with the brake casing 11d, and heat can be directly transferred from the coil case 14g to the brake casing 11d. The hub member 14a includes a key groove, and the rotor shaft 13 includes a key that fits into the key groove of the hub member 14a. The rotor shaft 13 is connected to the hub member 14a so that a large torque is transmitted to the hub member 14a via the key.

The movable friction plate 14c, the rotating friction plate 14b, and the fixed friction plate 14e are disk-shaped friction plates penetrating through the center, and these plates generate frictional force when they come into contact with each other. The brake 14 generates a braking torque via the frictional force of the friction plate. The movable friction plate 14c, the rotating friction plate 14b, and the fixed friction plate 14e are disposed side by side from the coil case 14g side in this order in the axial direction.

The fixed friction plate 14e is connected to the coil case 14g with a gap therebetween. Specifically, the fixed friction plate 14e is bolted to the coil case 14g with the collar interposed therebetween. The rotating friction plate 14b is engaged with the hub member 14a so that relative rotation such as spline coupling is suppressed and displacement in the axial direction is enabled. The rotating friction plate 14b rotates together with the hub member 14a. The movable friction plate 14c is supported so as to be restrained in the rotation direction and displaceable in the axial direction. The fixed friction plate 14e and the movable friction plate 14c are provided with a lining (abrasion material) 14f at a portion in contact with the rotating friction plate 14b.

The structure of the friction plate is not limited to the above example, and the number of friction plates is not particularly limited. The rotating friction plate 14b may be fixed to the hub member 14a, while the fixed friction plate 14e may not be provided. Furthermore, the lining 14f may be provided at the contact portion with the movable friction plate 14c. In addition, the lining 14f may not be provided at the contact portion with the rotating friction plate 14b, the contact portion with the fixed friction plate 14e, or either of these contact portions.

The coil case 14g includes an annular recessed portion 14g1 centered on the center axis O1. The recessed portion 14g1 is recessed in the axial direction and opens on the movable friction plate 14c side. The coil 14d is wound along the annular recessed portion 14g1 and held in the recessed portion 14g1. The coil case 14g is a magnetic body made of an iron-based material, amplifies the magnetism generated by energization of the coil 14d, and causes a magnetic force to act on the movable friction plate 14c. The movable friction plate 14c is a magnetic body made of an iron-based material, and is attracted by the magnetic force generated by the coil 14d.

Operation of Actuator and Brake

When the motor 12 is driven to rotate the rotor shaft 13 and the wave generator 15a, the motion of the wave generator 15a is transmitted to the external gear 15c. In this case, the external gear 15c is regulated to a shape along the outer peripheral surface of the wave generator 15a, and is bent into an elliptical shape having a long axis portion and the short axis portion when viewed from the axial direction. Furthermore, the external gear 15c meshes with the fixed first internal gear 15d at the long axis portion. Therefore, the external gear 15c does not rotate at the same rotation speed as the wave generator 15a, and the wave generator 15a rotates relatively inside the external gear 15c. With this relative rotation, the external gear 15c bends and deforms so that a long axis position and a short axis position move in the circumferential direction. The period of this deformation is proportional to the rotation period of the wave generator 15a. When the external gear 15c bends and deforms, the long axis position thereof moves, so that the position where the external gear 15c and the first internal gear 15d mesh with each other changes in the rotation direction. Here, it is assumed that the external gear 15c has 100 teeth and the first internal gear 15d has 102 teeth. As a result, every time the meshing position revolves once, the meshing teeth of the external gear 15c and the first internal gear 15d are displaced, and thus the external gear 15c rotates. With the above number of teeth, the rotating motion of the wave generator 15a is decelerated at a reduction ratio of 100:2 and transmitted to the external gear 15c. On the other hand, since the external gear 15c is meshed with the second internal gear 15e, the meshing position between the external gear 15c and the second internal gear 15e also changes in the rotation direction due to the rotation of the wave generator 15a. Here, when assuming the number of teeth of the external gear 15c and the number of teeth of the second internal gear 15e are the same as each other, the external gear 15c and the second internal gear 15e do not rotate relatively, and the rotating motion of the external gear 15c is decelerated at a reduction ratio of 1:1 and transmitted to the second internal gear 15e. As a result, the rotating motion of the wave generator 15a is decelerated at a reduction ratio of 100:2, transmitted to the second internal gear 15e, and output from the second internal gear 15e to the mating member 202 via the output member 16.

During the transmission of the above rotating motion, a rotational position of the rotor shaft 13 is detected by the input side rotation detector 18A, and a rotational position of the output member 16 is detected by the output side rotation detector 18B.

When the drive of the motor 12 is stopped and the rotating motion is stopped, a braking force is generated in the brake 14, so that the coil 14d is switched from an energized state to a non-energized state. By this switching, the magnetic force of the coil 14d is reduced, the movable friction plate 14c moves toward the fixed friction plate 14e via a biasing force of the spring material 14h, and the rotating friction plate 14b is interposed between the movable friction plate 14c and the fixed friction plate 14e. Due to this interposing, a frictional force is generated on the rotating friction plate 14b, and a braking force in the rotation direction is generated on the hub member 14a and the rotor shaft 13 in which the relative rotation with the rotating friction plate 14b is restricted. When the rotation of the rotor shaft 13 is stopped, the rotation of the output member 16 is also stopped, and this rotation stopped state is maintained. That is, the output member 16 does not rotate due to the weight of the mating member 202 or the like, and the brake 14 maintains the rotation stopped state. The static friction torque of the brake 14 depends on the biasing force of the spring material 14h.

When the motor 12 is driven, in order to release the static power of the brake 14, first, a first energization for attracting the movable friction plate 14c to the coil case 14g side against the biasing force of the spring material 14h is performed for the coil 14d. By the first energization, a magnetic force is generated in the coil 14d and the coil case 14g, and the movable friction plate 14c moves to the coil case 14g side by this magnetic force. By this movement, the interposing of the rotating friction plate 14b is released, and the braking of the rotating friction plate 14b, the hub member 14a, and the rotor shaft 13 is released. When the braking is released, a second energization for holding the position of the movable friction plate 14c is performed for the coil 14d. Since the first energization acts to displace the movable friction plate 14c, while the second energization maintains the movable friction plate 14c stationary, the second energization results in a lower voltage (smaller power) output than that of the first energization. During the drive of the motor 12, since the second energization of the coil 14d is continued, the release of the braking force is maintained.

Since the second energizing current is a current that generates a magnetic force opposing the biasing force of the spring material 14h, the second energizing current is related to the static friction torque of the brake 14. When the configuration of the brake 14 is the same, the larger the static friction torque of the brake 14, the larger the biasing force of the spring material 14h and the larger the second energizing current. That is, the larger the static friction torque of the brake 14, the larger the energizing current of the coil 14d and the larger the amount of heat generated by the coil 14d. When the second energization is continued, the heat generated in the coil 14d is transmitted to the coil case 14g, the brake casing 11d, the fins 11d3, and other members of the casing 11 (motor casing 11e, fin 11e2, relay casings 11c and 11f, outer peripheral portion of the first internal gear 15d functioning as a speed reducer casing, and the like) and is discharged to the outside.

Thermal Design of Brake

Subsequently, an example of the dimensions of the brake 14 will be described. However, the brake according to the present invention is not limited to the following aspects. In addition, in FIGS. 1, 3A, and 3B, the brake 14 is illustrated with an aspect ratio different from the actual one. In the related art, in the brakes that can be designed with a large outer diameter and a margin, there are thinner brakes, but in a case where the outer diameter is small, heat generation is a problem and it is difficult to make the brake thinner. As far as the inventor has investigated, in a compact brake with a coil case having a minimum outer diameter of 70 mm or less, there is no brake having a sufficiently thin (thickness D1/minimum outer diameter (R1×2) described later is 0.2 or less). It was particularly difficult to achieve thinning while ensuring the static friction torque of a predetermined value (0.1 Nm) or more. In the present embodiment, by considering heat dissipation to the brake casing and the motor casing instead of considering heat dissipation of a single brake, a desired thinning is achieved in a compact brake with a coil case having a minimum outer diameter of 70 mm or less.

The minimum outer diameter (minimum outer radius R1×2) of the coil case 14g is 70 mm or less, and 55 mm in the present embodiment. As illustrated in FIGS. 2A and 2B, the outer peripheral portion of the coil case 14g has a range H1 mainly occupied by a portion that functions as an outer peripheral wall of the recessed portion 14g1 and a range H2 occupied by a flange portion where the bolt or the spring material 14h is located. The coil case 14g has a small outer diameter in the range H1 and a large outer diameter in the range H2. The minimum outer diameter (R1×2) of the coil case 14g is equivalent to a length obtained by doubling the radius R1 from the center of rotation (center axis O1) of the hub member 14a to the outer peripheral surface in the range H1 of the coil case 14g.

The thickness D1 of the main part of the brake 14 is 0.2 times or less the minimum outer diameter of the coil case 14g, and is 10 mm in the present embodiment. As illustrated in FIGS. 2A, 2B, 3A, and 3B, the thickness of the main part means the distance from a first end surface S1 on the side farthest in the axial direction from the coil case 14g in the friction plate (fixed friction plate 14e, rotating friction plate 14b, and movable friction plate 14c) to a second end surface S2 on the side opposite to the first end surface S1 in the coil case 14g. In the present embodiment, the first end surface S1 is a counter-coil case side end surface of the fixed friction plate 14e.

Due to the minimum outer diameter and the thickness of the main part described above, the brake 14 is compact and thin, which contributes to the compactness of the actuator 1.

The static friction torque of the brake 14 is 0.1 Nm or more, and 0.16 Nm in the present embodiment. The static friction torque depends on the radius of the portion where the friction of the friction plate is generated and a static friction force, and the static friction force depends on the biasing force of the spring material 14h. The number of turns of the coil 14d, the wiring thickness, and the energizing current are set so as to generate a magnetic force opposing the biasing force of the spring material 14h.

Brake Temperature Rise Test

Normally, for a brake that operates via energization of a coil, a temperature rise value (increase value from an initial temperature before energization to a saturation temperature when a thermal equilibrium state is reached) of the coil when the coil is energized is measured according to a specified temperature rise test (for example, Japanese Industrial Standard JIS B1404-2). In the specified temperature rise test, the measurement condition is adopted in which the rated voltage is applied to the coil and the brake is continuously energized while the single brake is left on the heat insulating material. The thermal design of the brake is made such that a normal result can be obtained in a predetermined performance test of the brake even when the measured temperature rise occurs. For example, in a case where the temperature rise of the coil is too high, a thermal design is made such as enlarging the coil case to increase the heat dissipation effect.

On the other hand, in the temperature rise test of the brake 14 of the present embodiment, the temperature rise value of the coil (rise value from the initial temperature before energization to the saturation temperature when the thermal equilibrium state is reached) when the coil is energized is measured under the measurement conditions according to the actual usage state of the brake 14. Even when the temperature rise value of the coil 14d measured in this temperature rise test occurs, the thermal design of the brake 14 is made so that a normal result can be obtained in a predetermined performance test of the brake 14. As for the measurement condition according to the actual usage state of the brake 14, in a case where it is determined that the brake 14 is incorporated in the actuator 1, the state where the brake 14 is incorporated in the actuator 1 is adopted as a measurement condition. Furthermore, in a case where it is determined that the actuator 1 is incorporated in a higher-level device such as a robot, the state where the actuator 1 is incorporated in the higher-level device may be adopted as a measurement condition. Furthermore, under the above measurement conditions, a rated voltage may be adopted as the voltage output to the coil 14d during continuous energization, or a voltage for maintaining the position of the movable friction plate 14c displaced against the spring material 14h (voltage of the second energization described above) may be adopted.

An example of performing a temperature rise test on the brake 14 of the present embodiment under the JIS specified conditions and the measurement conditions of the embodiment is illustrated.

TABLE 1

Test result table

| Measurement conditions | Thickness of main part [mm] | Minimum outer diameter of coil case [mm] | Temperature rise value [° C.] |
|---|---|---|---|
| Actual aspect conditions | 10 | 55 | 11 |
| JIS specified conditions | 10 | 55 | 32 |

As illustrated in the test result table, when the brake 14 of the present embodiment is tested under JIS specified conditions, the saturation temperature of the brake 14 was 57° C. at a normal temperature of 25° C., and the temperature reached a temperature at which the result of the brake performance test might be abnormal. In such a case, a redesign is necessary to improve heat dissipation, for example, to increase the minimum outer diameter of the coil case 14g and the thickness of the main part of the brake 14.

On the other hand, when the temperature rise test was performed on the brake 14 of the present embodiment under the measurement conditions of the embodiment, the saturation temperature of the brake 14 was 36° C. at a normal temperature of 25° C., and remained at a temperature at which a normal result could be obtained in the performance test of the brake 14. The low temperature rise value is obtained because the heat generated in the coil 14d is transferred from the coil case 14g to the brake casing 11d and the motor casing 11e of the actuator 1 and efficiently dissipated to the outside by using the actual usage state as the measurement condition. Based on such test results, even when the thickness of the main part of the brake 14 and the minimum outer diameter of the coil case 14g illustrated in the above test result table are adopted, it is verified that the performance of the brake 14 does not become abnormal in actual use. By adopting the temperature rise test of the present embodiment, it is possible to use the brake 14 in the normal temperature range with high reliability supported by the test, while achieving the miniaturization and thinning of the brake 14. The numerical values of the saturation temperatures of 57° C. and 36° C. in the above test results are not particularly important (the technical scope of the present invention is not limited), and it is important to demonstrate that the heat generated in the test with heat dissipated to the brake casing 11d and the motor casing 11e is smaller than the heat generated in the single brake test. That is, it is important to support the idea of the present invention that even a brake having a small outer diameter can be made thinner in consideration of heat dissipation to the brake casing 11d and the motor casing 11e.

Actuator Specification

Figure 4:
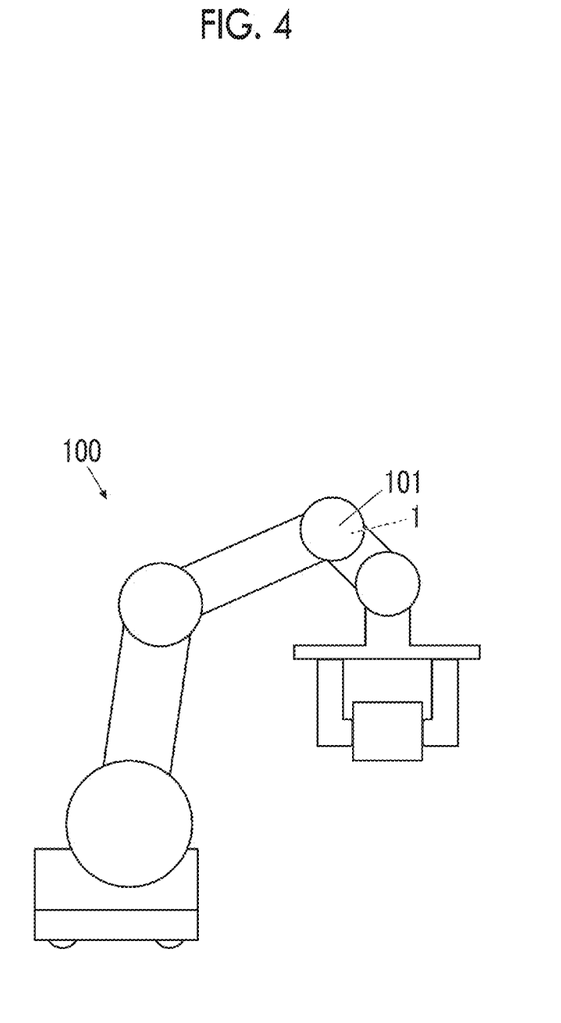
FIG. 4 is a diagram illustrating a cooperative robot equipped with the actuator of the embodiment.

FIG. 4 is a diagram illustrating a cooperative robot equipped with the actuator of the embodiment. Here, an example of an application and use of the actuator 1 will be described. The application and specification of the actuator according to the present invention are not limited to the following example.

The actuator 1 is used as a driving device for a joint portion 101 of a cooperative robot 100 that works in cooperation with a human. In this case, the support member 201 is a base end side arm of the joint portion 101, and the mating member 202 is a tip end side arm. The cooperative robot 100 includes a detection unit that detects contact with a person. The actuator 1 has a specification that the operation ratio in a case of being incorporated as a driving device for the joint portion 101 of the cooperative robot 100 is 20% ED or less. The operation ratio means the ratio of an operation time TJ of the actuator 1 to an operation time TR of the cooperative robot in which the actuator 1 is incorporated, and is represented by (TJ/TR)×100 [% ED]. The operation time TR of the cooperative robot itself can be defined as a time when the power of the cooperative robot is turned on or a time when the power of the drive source (servo motor) for driving each joint is turned on. Therefore, the operation time TR of the cooperative robot itself includes a waiting time when the cooperative robot works on a certain workpiece and waits for a next workpiece to be set. In addition, the operation time TJ of the actuator 1 can be defined as a time during which the motor 12 for driving the actuator 1 is rotating (rotation is controlled).

As described above, according to the actuator 1 of the present embodiment, the motor 12 and the brake 14 are provided, the minimum outer diameter "R1×2" of the coil case 14g of the brake 14 is 70 mm or less, and the thickness D1 of the main part is 0.2 times or less of the minimum outer diameter. With such dimensions, a compact and thin brake 14 can be achieved, which can contribute to the compactification of the actuator 1. Furthermore, according to the actuator 1 of the present embodiment, the motor casing 11e and the brake casing 11d connected to each other are provided, and the heat of the brake 14 is released to the outside of the actuator 1 through the casing 11. In the concept of thermal design of the brake in the related art, the thermal design is performed without considering the heat dissipation of the brake 14 incorporated in the device during actual use, so that the compact and thin brake 14 as described above was not established. However, in the concept of thermal design of the present embodiment, the temperature rise test of the brake 14 is performed under measurement conditions suitable for actual use in which the heat of the coil 14*d* is transferred to the coil case 14*g*, the brake casing 11*d*, and the motor casing 11*e* and released, and the performance of the brake 14 is verified so that normal operation can be obtained even when the measured temperature rises. Therefore, it is possible to realize an actuator 1 provided with a brake 14 that can operate in a normal temperature range with high reliability and achieve braking and releasing, while being a compact and thin brake 14 that could not be achieved by the concept of thermal design in the related art. Furthermore, in the actuator 1 of the present embodiment, since the static friction torque of the brake 14 is 0.1 Nm or more, the actuator 1 can exert a necessary and sufficient stop holding force.

Furthermore, according to the actuator 1 of the present embodiment, the brake casing 11*d* is in contact with the outer peripheral surface of the coil case 14*g*. Therefore, the heat of the coil 14*d* can be transferred from the coil case 14*g* to the brake casing 11*d* with high conductivity and released to the outside of the actuator 1. That is, the heat dissipation of the brake 14 is improved. In the concept of thermal design of the brake in the related art, since such heat dissipation in actual use is not taken into consideration, even with the above heat dissipation, the brake cannot be made compact and thinner. However, in the concept of thermal design of the brake 14 of the present embodiment, since the dimensions of the brake 14 can be designed to reflect the heat dissipation in actual use, the brake 14 can be made compact and thinner by improving the heat dissipation as described above.

Furthermore, according to the actuator 1 of the present embodiment, since the brake casing 11*d* and the motor casing 11*e* include the fins 11*d*3 and 11*e*2, the heat dissipation of the brake 14 can be further improved, and the brake 14 can be made even more compact and thinner. Furthermore, the actuator 1 includes the speed reducer 15 and the speed reducer casing (outer peripheral portion of the first internal gear 15*d*) for accommodating the constituent member of the speed reducer 15 and the first internal gear 15*d* is connected to the brake casing 11*d*. Therefore, the heat dissipation of the brake 14 is further improved, and the brake 14 can be made even more compact and thinned. The actuator 1 may have a configuration having one of the fins 11*d*3 or 11*e*2, and even in that case, the brake 14 can be made even more compact and thinner by improving the heat dissipation.

Furthermore, the actuator 1 of the present embodiment is adopted as a device for driving the joint portion 101 of the cooperative robot 100, and the operation ratio is 20% ED or less. The driving device of the joint portion 101 of the cooperative robot 100 is often specified to have a low operation ratio such as 20% ED or less. In the brake 14 of the present embodiment, the coil 14*d* is continuously energized during operation. Therefore, in a case where the specification has a low operation ratio, the energization time of the coil 14*d* is short and the heat generation is small, so that the brake 14 can be made even more compact and thinner.

Furthermore, according to the brake 14 of the present embodiment, the minimum outer diameter "R1×2" of the coil case 14*g* is 70 mm or less, and the thickness D1 of the main part is 0.2 times or less of the minimum outer diameter. Therefore, a compact and thin configuration that could not be achieved by the concept of thermal design in the related art is achieved. Furthermore, even with such a compact and thin configuration, it can be verified that the brake 14 operates in a normal temperature range and the normal performance of the brake 14 can be maintained, based on the temperature rise test performed under measurement conditions suitable for actual use. Therefore, it is possible to provide a brake 14 that can exhibit normal performance with high reliability, while being a compact and thin brake 14 that could not be achieved by the concept of thermal design in the related art. Specifically, for the brake 14 for which it has been determined that it is to be mounted on the actuator 1 having the brake casing 11*d* and the motor casing 11*e* connected to each other, it is possible to provide the brake 14 that has been verified to operate in a normal temperature range and to maintain normal performance, while being compact and thin, based on the temperature rise test suitable for actual use where the heat of the coil 14*d* is released through the brake casing 11*d* and the motor casing 11*e*.

Hereinbefore, the embodiment of the present invention has been described. However, the present invention is not limited to the above embodiment. For example, in the above embodiment, the connection between the brake casing 11*d* and the motor casing 11*e* is illustrated as a direct connection, but the connection between the brake casing and the motor casing according to the present invention may be a connection via a relay member. Even in this case, high heat dissipation can be obtained via the relay member. The same applies to the connection between the brake casing and the speed reducer casing according to the present invention. In addition, in the above embodiment, it is described that the outer peripheral surface of the coil case 14*g* is in contact with the brake casing 11*d*, but the aspect of contact may include an aspect in which the coil case 14*g* is tightly fitted into the brake casing 11*d*, an aspect in which the coil case 14*g* is gap-fitted, and the like. In addition, the coil case 14*g* and the brake casing 11*d* may be brought into contact with each other in the axial direction instead of being brought into contact with each other in the radial direction. In addition, in the above embodiment, the example in which the brake 14 is incorporated in the actuator 1 is illustrated, but the device in which the brake 14 is incorporated may be a device other than the actuator. In addition, the details illustrated in the embodiment, such as the use of the actuator 1, the presence or absence of components other than the motor 12 and the brake 14 in the actuator 1, and the type of the speed reducer 15, can be appropriately changed without departing from the scope of the invention.

It should be understood that the invention is not limited to the above-described embodiment, but may be modified into various forms on the basis of the spirit of the invention. Additionally, the modifications are included in the scope of the invention.

What is claimed is:

1. An actuator comprising:
   a motor;
   a brake;
   a motor casing that accommodates a constituent member of the motor; and
   a brake casing that accommodates a constituent member of the brake,
   wherein:
   the motor casing and the brake casing are connected to each other, the brake includes a stator having a coil and a coil case, and a friction plate, a minimum outer diameter of the coil case is 70 mm or less, and a value obtained by dividing a distance from a first end surface of the friction plate on a side farthest in an axial direction from the coil case to a second end surface of the coil case on a side opposite to the first end surface by the minimum outer diameter is 0.2 or less;

the brake further includes a hub member;

the friction plate includes a rotating friction plate, a movable friction plate which is displaceable toward the rotating friction plate, and a fixed friction plate which faces the rotating friction plate on a side opposite to the movable friction plate;

the rotating friction plate, the movable friction plate, and the fixed friction plate have a substantially disk shape having an open center;

the rotating friction plate engages with the hub member so that the rotating friction plate rotates together with the hub member and is displaceable in the axial direction; and the fixed friction plate is connected to the coil case with a gap therebetween.

2. The actuator according to claim 1, further comprising:
a speed reducer that decelerates a rotating motion transmitted from the motor;
an output member that outputs a rotating motion to an outside of a device; and
an output side casing that covers the output member from a radial direction,
wherein the output side casing rotatably supports the output member via a bearing.

3. The actuator according to claim 2,
wherein the output member includes a first member that is connected to the outside of the device via a bolt, a second member that is connected to the speed reducer via a bolt, and a shaft portion.

4. The actuator according to claim 3,
wherein the first member is disposed on an output side of the second member, internally fits the shaft portion, and externally fits an inner ring of the bearing, and
the first member includes a first bolt insertion hole that accommodates a head of the bolt, and a second bolt insertion hole through which a shaft portion of the bolt passes.

5. The actuator according to claim 1,
wherein the motor casing includes two annular protrusion portions protruding to a counter-output side and an output side.

6. The actuator according to claim 5,
wherein the two annular protrusion portions have a diameter smaller than a maximum outer diameter of the motor casing.

7. The actuator according to claim 1,
wherein at least one of the motor casing and the brake casing includes a fin on an outer periphery.

8. The actuator according to claim 7,
wherein the fin extends in a radial direction and a circumferential direction.

9. The actuator according to claim 1,
wherein a static friction torque of the brake is 0.1 Nm or more.

10. The actuator according to claim 1,
wherein the brake casing is in contact with an outer peripheral surface of the coil case.

11. The actuator according to claim 1, further comprising:
a circuit unit on which an electric circuit is mounted; and
a board casing that covers the circuit unit from a radial direction and a counter-output side in the axial direction,
wherein the board casing internally fits an outer ring of a bearing.

12. The actuator according to claim 1, further comprising:
a detection unit that detects rotation of the motor; and
a relay casing that covers the detection unit from a radial direction,
wherein the relay casing includes a wiring lead-out hole for leading out a wiring of the motor and the brake in a part in a circumferential direction.

13. The actuator according to claim 1,
wherein the actuator drives a joint portion of a cooperative robot that works in cooperation with a human, and has an operation ratio of 20% ED or less.

14. An actuator comprising:
a motor;
a brake;
a motor casing that accommodates a constituent member of the motor;
a brake casing that accommodates a constituent member of the brake;
a speed reducer that decelerates a rotating motion transmitted from the motor; and
a speed reducer casing that accommodates a constituent member of the speed reducer,
wherein the motor casing and the brake casing are connected to each other, the brake includes a stator having a coil and a coil case, and a friction plate, a minimum outer diameter of the coil case is 70 mm or less, and a value obtained by dividing a distance from a first end surface of the friction plate on a side farthest in an axial direction from the coil case to a second end surface of the coil case on a side opposite to the first end surface by the minimum outer diameter is 0.2 or less, and
the brake casing and the speed reducer casing are connected to each other.

15. The actuator according to claim 14,
wherein the speed reducer is a tubular bending meshing type gear mechanism, and includes a wave generator, a wave generator bearing, an external gear that bends and deforms due to rotation of the wave generator, a speed reducer casing that meshes with the external gear, and an internal gear that meshes with the external gear in a range on an output side in the axial direction.

16. The actuator according to claim 15,
wherein in the wave generator, a cross-sectional outer shape perpendicular to the axial direction in a shaft portion has a substantially circular shape centered on a center axis, and a cross-sectional outer shape perpendicular to the axial direction at a portion with which the wave generator bearing is in contact has a substantially elliptical shape,
the external gear has a flexibility, and
the speed reducer casing meshes with the external gear in a range on a counter-output side in the axial direction.

17. A brake comprising:
a hub member;
a stator including a coil and a coil case; and
a friction plate,
wherein:
a minimum outer diameter of the coil case is 70 mm or less, and a value obtained by dividing a distance from a first end surface of the friction plate on a side farthest in an axial direction from the coil case to a second end surface of the coil case on a side opposite to the first end surface by the minimum outer diameter is 0.2 or less;

the friction plate includes a rotating friction plate, a movable friction plate which is displaceable toward the rotating friction plate, and a fixed friction plate which faces the rotating friction plate on a side opposite to the movable friction plate;

the rotating friction plate, the movable friction plate, and the fixed friction plate have a substantially disk shape having an open center;

the rotating friction plate engages with the hub member so that the rotating friction plate rotates together with the hub member and is displaceable in the axial direction; and the fixed friction plate is connected to the coil case with a gap therebetween.

18. The brake according to claim 17, wherein the brake is mounted on an actuator that includes a motor, a motor casing accommodating a constituent member of the motor, and a brake casing accommodating a constituent member of the brake, and in which the motor casing and the brake casing are connected to each other.

* * * * *